United States Patent

[11] 3,619,494

| [72] | Inventor | Colin Fisher<br>Meldreth, Royston, England |
|------|----------|---------------------------------------------|
| [21] | Appl. No. | 820,180 |
| [22] | Filed | Apr. 29, 1969 |
| [45] | Patented | Nov. 9, 1971 |
| [73] | Assignee | Metals Research Limited<br>Melbourn, Royston, England |
| [32] | Priority | May 1, 1968 |
| [33] |  | Great Britain |
| [31] |  | 20,613/68 |

[54] COUNTING SYSTEMS IN IMAGE ANALYSIS EMPLOYING LINE SCANNING TECHNIQUES
35 Claims, 15 Drawing Figs.

[52] U.S. Cl. .................................................. 178/6.8,
178/6
[51] Int. Cl. .................................................. H04h 7/02
[50] Field of Search .......................................... 178/61 ND,
6.8; 235/92

[56] References Cited
UNITED STATES PATENTS
| 3,049,588 | 8/1962 | Barnett .......................... | 178/61 ND |
| 2,803,406 | 8/1957 | Nuttall .......................... | 178/61 ND |

Primary Examiner—Richard Murray
Assistant Examiner—Barry Leibowitz
Attorney—Beveridge & DeGrandi ABSTRACT: Systems for counting features in image analysis systems employing line scanning in which a single pulse is generated and the end of the scan of each feature. Information associated with each feature can also be retained for release at the same instant as the count pulse. In some systems means are provided for advancing information in the frame scan direction against the line scan direction to thereby advance the instant at which information is available in the next line subject to the local shape of the feature. The preferred feature of such systems is a degree of option whereby the circuit can select the best of a number of alternative time intervals by which information can be advanced so as to reduce the area of paralysis beyond the feature in the line scan direction.

A system is disclosed for producing a signal having a parameter whose value is representative of one or more geometrical properties of a feature under analysis in which increments of information are obtained from each line scan intersecting the feature and accumulated in a memory device for processing. The final information signal is then released by the count pulse.

A further system is disclosed by which a size criterion can be placed on the intersects of line scans with a feature and a count pulse generated only if at least one of the intersects exceeds the size limitation.

COUNTING SYSTEMS IN IMAGE ANALYSIS EMPLOYING LINE SCANNING TECHNIQUES

This invention concerns apparatus for analyzing a signal obtained by line scanning, in particular for counting features in a field of view and associating the counted features in time coincidence with information relating to a parameter of each feature. Typically the apparatus is employed for sizing features.

By definition a feature in the field of view is an area of the field having a sufficiently different optical characteristic from its immediate surroundings, as to be distinguishable (by illuminating the field either by incident or transmitted light) from its immediate surroundings due to it being for example, lighter or darker, or a different color.

In general an image of the field containing the features is scanned by an inspection spot in a series of lines. The resulting variations in optical intensity in the image, due to the features are converted to an electronic signal exactly comparable to a television video wave form, the amplitude of the video signal varying in sympathy with the variations in optical intensity. To this end a television camera is employed and where microscopic specimens are concerned, this is coupled to a light microscope.

Figure 10:
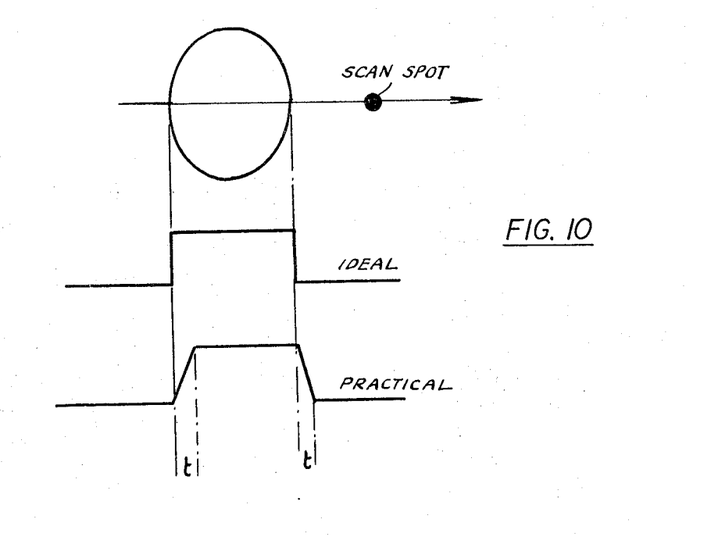
FIG. 10 is a diagrammatical illustration of an ideal video signal and practical video signal which is obtained when scanning an image larger than the scanning spot.

A video signal has a limited response to fine detail and its characteristic resolution is determined, inter alia by the bandwidth of electronic equipment through which it passes, the resolution of any optical system employed and the effective size of the scanning spot. The wave form will therefore have a finite time of response to any sudden difference in optical intensity in the field under examination. Processing a video signal so as to more closely approach an ideal video signal is referred to as detection. My copending U.S. Pat. application No. 820,532 refers to improved detection techniques by which an idealized binary type signal can be obtained from the amplitude variations in a video signal due to variations in optical intensity in the image. FIG. 10 of the drawings illustrates diagrammatically a typical video amplitude variation which is obtained when scanning a feature larger than the scanning spot and a corresponding ideal video signal wave form. The video signals applied to the circuits in the present application will therefore be considered to comprise a series of rectangular pulses and hereafter the term "video signal" will be taken to mean an ideal video signal.

The amplitude of the video signal output of a television camera varies from a first level to a second level as the scanning spot crosses the boundary defining a feature in the field. Assuming that the optical intensity within the feature is substantially constant, the video signal amplitude will remain at or near the second level until the spot leaves the feature when it will revert to the first level again (corresponding to the optical intensity surrounding the feature). Since the path of the scanning spot across the feature is a straight line this can be thought of as a "chord" of the feature and with constant scanning speed, the duration of the amplitude change due to the feature is a measure of the length of the chord. Thus, the phrase "line scan intersection with a feature" means the chord defined by the path of the scanning spot across the feature in the image and the "pulse arising from such an intersection" means the amplitude change in the video signal due to the different optical intensities of the feature and surround.

Known devices for counting and sizing features suffer from one or more of the following deficiencies:

a. multiple counting. Conventional systems will usually count simple circular features correctly but many produce errors on more complex shapes such as long thin features lying near the horizontal or reentrant shapes.

b. areas of paralysis. Most systems give rise to certain regions around or associated with features in an image in the form of shadow areas and if any features lie wholly or partially within such a shadow area it cannot be distinguished.

c. sizing breakup. Some simple conventional systems work incorrectly on reentrant features in that they can give rise to multiple counting from single features as size discrimination levels approach the critical value.

d. The instant at which information relating to a scanned feature is released is often varied by adjustment of threshold discrimination levels and other circuit parameters.

It is therefore a primary object of the present invention to provide apparatus which does not suffer from these disadvantages.

In many applications of analysis it is required to count the number of individual features within a field of view. For example, where powder particles are under analysis each powder particle would represent a feature in an image and the object of the analysis may be to find the total number of particles in the field of view. As each particle is scanned by the scanning spot this will give rise to a change in amplitude of the video signal but since each particle will be scanned by the spot more than once (in general), merely counting the number of pulses caused by the amplitude variations in the video signal will produce multiple counts from single features.

One apparatus for counting individual features has been described in U.S. Pat. Specification No. 2,803,406. This apparatus includes means for delaying a video signal from one line scan to the next, means for comparing intersect pulses derived from adjacent line scans and means to identify the pulse corresponding to the first intersect with a feature to release a count signal for the feature at the leading edge of this intersect pulse. The specification also describes a modification in which the count signal is derived from the end of each delayed intersect pulse and the means operable in response to the comparison releases a count signal for the feature instead of the first. Both apparatus will produce errors due to multiple counting of reentrant-shaped features. Apparatus is also illustrated by which different counts are made in response to different transition criteria applied to the intersect information so that by subtracting some counts from other counts it is possible to eliminate errors due to miscounting of reentrant features. However, this method employs considerable hardware and is expensive. Furthermore, complex interconnection of computers to calculate the addition and subtraction of the various count results is necessary, if a direct readout is required.

The invention provides apparatus employing line scanning for counting individual features in which video signal from each line scan is delayed and compared with video signal from the next line scan for the purpose of generating a count pulse for the feature, but which differs from the apparatus described in U.S. 2,803,406 in that errors due to multiple counting of reentrant features are avoided by the provision of circuit means for withholding a signal corresponding to the trailing edge of a line scan intersect pulse by an amount just sufficient to bring its trailing edge into coincidence with the trailing edge of a line scan intersect pulse from the same feature delayed from the previous line scan, thereby to associate line scan intersect pulses arising from the scanning of divergent limbs of a reentrant feature. Conveniently this is achieved by a bistable pulse forming device in the signal path to the line scan delay means, the bistable device being switched into one output state by a signal corresponding to the leading edge of an intersect pulse and into its other output state by a signal corresponding to the trailing edge of the intersect pulse *or* a signal corresponding to the trailing edge of an intersect pulse delayed from the previous line scan which is coincident with the first mentioned intersect pulse over at least some of its length, whichever signal occurs later in time.

The effect of the additional circuit means is to fill in the space between the limbs of reentrant features which point downwardly or in the direction of line scan, so as to associate the line scan intersects from the two limbs as being from the same feature. In this way the generation of a count pulse for a feature is delayed until it is clearly established that the last part of a feature (in the direction of scanning) has been scanned.

In a preferred embodiment of counting apparatus line scan intersect information is advanced in the frame scan direction but against the line scan direction by employing a time delay having a delay which is less than one line scan period by a known time interval, thereby to reduce the shadow area added to the feature due to withholding the trailing edge signals of the line scan intersect pulses arising therefrom.

It is possible to control the amount of advance by providing means for comparing line scan intersect information in one line scan with that in the previous line scan separated by different intervals of time equal to or less than one line scan period from that in the said one line scan thereby to indicate when a signal corresponding to the trailing edge of an intersect pulse in said one line scan occurs before a signal corresponding to the trailing edge of a coincident intersect pulse from the previous line scan by at least a known time increment and means for releasing the trailing edge signal of the intersect pulse on the said one line scan in advance of the delayed trailing edge signal from the previous line by said known time increment, in response to such indication.

One may also be interested in characterizing the separate features in an image by, for example area, length or shape etc. and it is possible to derive electrical signals which are representative of such feature parameters to that size distributions or other characterization groupings can be made. Apparatus for performing a size distribution on features is described in U.S. Pat. Specification No. 2,936,953. This apparatus includes sizing means for removing from each pulse arising from a line scan intersection with a feature, a portion of duration corresponding to a selected length of line scan intersect so that only that part of the duration of each pulse which exceeds the selected portion is passed for analysis, means for delaying video signal from one line scan to the next and means for generating a count signal from the first pulse portion passed by the sizing means for each feature. By adjusting the duration of the portion removed from each pulse, so a different minimum size criterion may be applied to the features, thereby allowing a size distribution to be obtained.

However this apparatus is of limited use, since it subjects the line scan intersect pulses to a size discrimination before performing a count function on a feature and produces a count pulse for a feature from only the first intersect pulse passed for any feature. It is thus impossible to associate with the count pulse any information derived during or as a result of scanning the feature.

The present invention provides apparatus which is not only capable of performing a size analysis on line scan intersect pulses but can be used for counting features in time coincidence with information relating to a parameter of the features and which differs from this known apparatus in that it includes means for generating a single anticoincidence pulse for each feature an interval of time determined solely by the feature geometry, after the last line scan intersection of the feature, computer means for generating an information signal representative of a feature parameter during scanning of the feature, memory means for retaining the information signal from line to line and addressing means operable on the release of the anticoincidence pulse for a feature to address the memory means and release the information signal stored therein, relating to that feature.

The invention thus provides an anticoincidence pulse which is fixed relative to its associated feature so that the instant at which information relating to a parameter of the feature, is released, is fixed relative to its associated feature.

Thus when performing a size distribution all the line scan intersect chords from each feature are submitted irrespective of their size for the purpose of deriving the anticoincidence pulse for a feature (which controls the generation of the count pulse therefore) and the size criterion is applied separately and a count pulse is generated if one or more chords satisfy the criterion, the count pulse being delayed for delivery at the same time as the anticoincidence point. In this way multiple counting of reentrant features is prevented, when performing a size distribution.

It is to be understood that the present invention is not limited to apparatus for performing size distributions only but includes apparatus for associating an information signal representing any chosen parameter of a feature in time coincidence with a video signal of the feature, obtained by line scanning.

Preferably the line scan intersect information determining the anticoincidence pulse and the information relating to a feature parameter are both advanced in the frame scan direction but against the line scan direction by employing signal delay devices having delays which are less than one line scan period by a known time interval. To this end the memory means preferably comprises separate signal delay means whereby the information signal retained thereby from line to line is available for release or recirculation during a line after an interval of less than one line scan period.

In this way the feature parameter information is advanced along with the anticoincidence pulse when reduction of shadow area (due to stretching of line scan intersect pulses) is employed, so as to be available for release with an advanced anticoincidence pulse.

The invention also provides apparatus for counting features in time coincidence with information relating to a parameter of the features in which video signal from each line scan is delayed and compared with video signal from the next line scan to control the generation of a count pulse for the feature characterized by computer means for deriving an information signal relating to a parameter of a feature during a line scan intersection therewith, means for storing the information signal from one line scan to the next, means for recirculating the information signal and gating means operable on release of the count pulse for the feature, to release the information signal therewith.

The apparatus described in U.S. Pat. Specification No. 2,936,953 can produce incorrect counts when the size criterion approaches the width of a feature in the line scan direction so that feature breakup can occur. Thus, in the case of a feature containing two regions larger than the size criterion which are joined by an isthmus which is smaller than the size criterion, two count pulses will be generated for the feature.

The invention thus provides alternative apparatus for counting features containing at least one line scan intersect greater than a predetermined size (for which a trigger pulse is generated) which differs from that illustrated and described in U.S. Pat. Specification No. 2,936,953 in that it includes means responsive to video from the current line scan and from the previous line scan to generate an output signal when both a current and delayed coincident intersect pulse have ended, means responsive to a trigger pulse and an output signal to generate a tag pulse for the line scan intersect pulse, means to delay a generated tag pulse for the duration of one line scan and circuit means responsive to tag pulses from current and previous line scans to release an output signal as a single count signal for a feature when an output signal is received after a tag pulse from a previous line but before a tag pulse from the current line.

The invention also provides apparatus for indicating when the scanning spot lies within a shadow area of a feature in which a paralysis pulse is generated when the trailing edge of the unstretched portion of a line scan intersect pulse on one line scan occurs before the trailing edge of a stretched line scan intersect pulse delayed from the previous line scan, at least some of which is coincident with the intersect pulse on the one line scan, the magnitude of the paralysis pulse indicating the difference in time between the two trailing edges. The paralysis pulse therefore indicates the time following the trailing edge of a line scan intersect pulse on the one line scan during which the apparatus is insensitive to features or feature portions lying beyond the feature to which the intersect pulse relates, in the direction of line scan.

The paralysis pulse may be employed to inhibit line scan intersect pulses arising during a paralysis pulse, from being counted by the apparatus. In addition or alternatively switch means may be employed to divert intersect information arising during a paralysis pulse, to separate counting apparatus.

When employed with computer means generating feature parameter information from line scan intersect information from the video signal, the paralysis pulse is conveniently employed to gate the computer means into an OFF condition. Alternatively, the pulse may be employed to divert feature parameter information arising during its duration, to a second computer means, thereby keeping separate line scan intersect information arising from a feature or feature portion lying within the shadow area of another feature.

In order to overcome the last deficiency (d) listed above, the invention proposes the use of shift registers to delay the video signal from line to line. This makes the synchronization of the various signals much simpler since it allows the system to be so called "clock-controlled," from a single master oscillator.

Other objects and advantages of the present invention will be apparent from the accompanying drawings and description thereof.

In the drawings:

FIG. 6A illustrates a feature lying in a paralysis region due to the shadow area of an adjacent larger feature.

Figure 1:
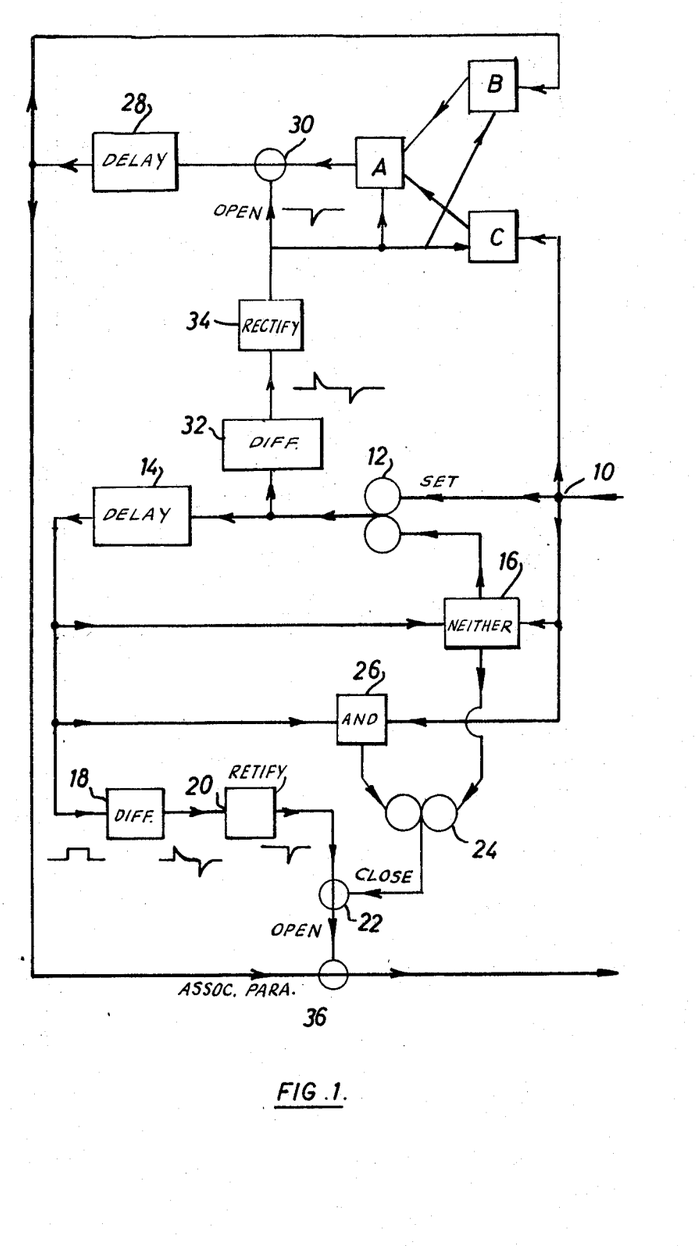
FIG. 1 illustrates a system for providing a single count pulse fixed relative to a scanned feature and computing a parameter derived from the characteristics of the video signal or some other synchronous signal and keeping the computed parameter associated with the particular feature concerned.
Figure 1A:
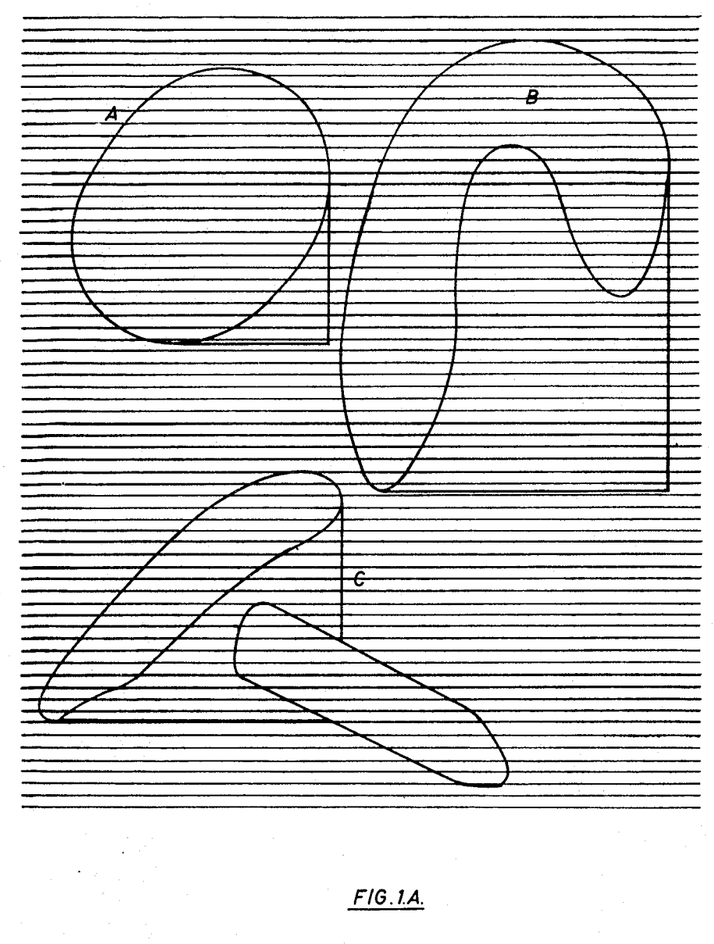
FIG. 1A illustrates graphically a number of features and the paralysis or shadow areas produced by the system of FIG. 1 together with the position of the counting pulses.

In FIG. 1 the actual counting is performed by a "coincidence circuit" shown joined in the center of the diagram of FIG. 1. The video signal is applied to the junction 10 and serves as a set-signal for a bistable device 12 to produce a so-called "modified video" V'. The modified video is applied to a coincidence delay device 14 (such as a delay line) which introduces a time delay equivalent to the line scan time T. The video signal is also applied to one side of the Neither-gate 16 and the delay modified video V' from the delayed device 14 is applied to the other side of the Neither-gate 16, the arrangement being such that when neither signal is present a signal passes from the Neither-gate 16 to reset the binary device 12. Modified video V' thus starts when a video signal is first received at junction 10 and stops when both video and unmodified video from a previous line stops. The effect is to add large shadow regions to the features as illustrated in FIG. 1A.

The bottom right-hand corner of each feature is detected by an anticoincidence circuit (shown in the lower part of FIG. 1) which comprises a differentiating circuit 18 and a rectifying circuit 20 which serve to produce a pulse corresponding to the end of each modified video signal in each line. The pulse from the rectifying circuit 20 is fed through a gate 22 which is controlled by a bistable device 24 which is set to close the gate if there has been coincidence, that is, a video signal from the current scan line and modified video from the previous scan line have coincided. The bistable device 24 is provided with two inputs, one from the Neither-gate 16 and the from an And gate 26 whose two inputs applied thereto have delayed video from the coincidence delay 14 and current video from the junction 10. The output from the And gate 26 serves to supply one side of the binary device 24. Thus the binary is reset thereby opening the gate 22 immediately after the end of modified video V', when there is no video signal content on the current scan line corresponding to that feature. In this way a pulse will only pass through the gate 22 at the "bottom right-hand corner" of the modified feature shape. For convenience this pulse is referred to as "an anticoincidence pulse," i.e. ACP.

The circuit can also be used for computing a parameter derived from the characteristics of the video signal or some other synchronous signal keeping the value in association with the particular feature concerned. This function is performed by the associated parameter circuit shown at the top of the circuit diagram. The associated parameter circuit includes a first logic module or block C to which the current video signal from junction 10 is supplied. This logic unit C produces the particular parameter of interest in synchronism with the current video signal for example, its presence, its length, its position in the scan, the value of some other related signal etc. A second logic module B receives and holds the signal from an associated parameter delay 28 (such as a delay line or shift register). This signal corresponds to the value of the parameter computed up to and including the previous scan line. The third logic module A accepts both these values and computes a fresh value to include the information from the current scan line. This new value is held in the logic module A ready for application to the delay 28. The input for a differentiating circuit 32 is derived from the modified video signal V' and the differentiated signal is supplied to a rectifying circuit. The differentiating and rectifying circuits 32, 34 thereby produce one pulse at the end of each modified video signal V'. This pulse serves to open the gate 30 at a time, corresponding to the end of a modified video signal, so that the output from the logic module A is applied immediately to the associated parameter delay 28.

The output from the rectifying circuit 34 is also arranged to reset the logic modules A, B and C and the released associated parameter stored in the delay device 28 is released at the end of the feature, by opening a gate 36.

More than one associated parameter circuit may be used in conjunction with a single coincidence system.

Various arrangements of logic modules A, B and C can give usable output characteristics. For example, by arranging that logic module C registers the length of the chord in the current line scan and logic block A adds the output from B and C the associated parameter becomes the area of the feature. Similarly the height, the width or the perimeter of a feature may be determined. The associated parameter can therefore have a wide dynamic range and the associated parameter delay 28 must therefore have a large information handling capacity. Modulated carrier systems and multiple delay lines handling parallel binary digital data may be used.

It data handling capacity is limited, a useful arrangement can be obtained by arranging that module C only responds when the chord in the direction of line scan in the current scan line is longer than a predetermined length. Blocks A and B then merely recirculate this fact and only one "bit" of information is required the associated parameter recording whether or not the feature contains a chord in the line scan direction longer than the predetermined value. In this way features can be size discriminated on the basis of the longest chord in the line scan direction with no risk of reentrant features being miscounted.

It will be appreciated that although two delay devices such as delay lines 14 and 28 are shown in FIG. 1 it is possible to open both the coincidence delay and the associated parameter delay in a single delay device by the use of multilevel modulation or some other means of increasing the information handling capacity of a single delay device.

Figure 2:
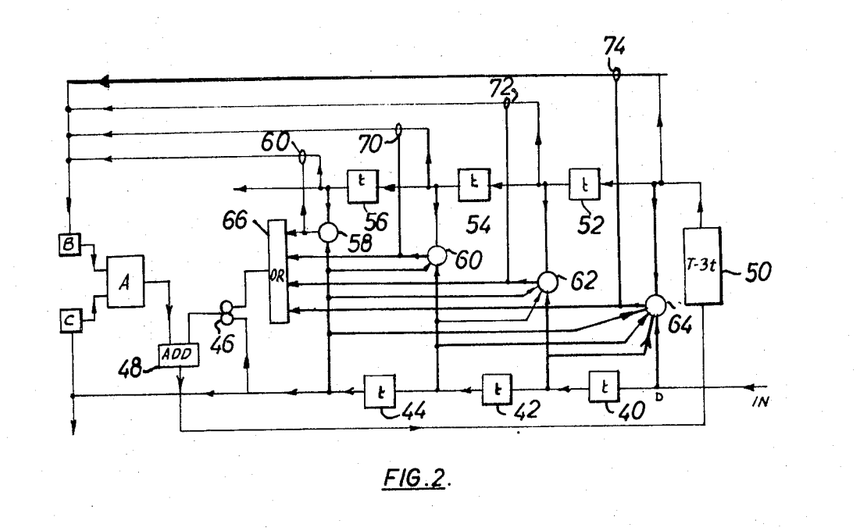
FIG. 2 illustrates a system in which the shadow areas are considerably reduced to thereby reduce the areas of paralysis.

FIG. 2 illustrates a system for reducing the shadow areas added to features for example as a result of the counting technique employed in FIG. 1. This facility greatly reduces the addition of paralysis regions and allows the termination of the coincidence region (shadow area) to fall more closely under overhangs of a feature. In principle, the object of the system is to reset a binary device producing feature information from each line, earlier than would otherwise be possible.

The video signal is applied at the bottom right-hand corner of the figure to three series connected delay devices 40, 42 and 44 each delay device introducing a short time delay corresponding to one picture element. As previously described with reference to FIG. 1, the output from the delay device 44 is applied to a binary device 46 to produce modified video signal $V_n'$. The modified video $V_n'$ passes through an adding device 48 and is applied to a delay device 50 of approximately the line scan time period after which the delayed modified video signal is used to generate the coincidence criterion to reset the binary device 46. However the delay device 50 is deliberately made three picture elements short so that the delayed modified video from the delay device 50 occurs three picture elements short of a complete line scan delay. The three picture element delays are made up by three delays 52, 54, 56 connected in series and the output from the delay device 50 is applied to the input of the delay device 52.

If point A is considered (in time) to be the picture element under current examination then points B, C and D are respectively one, two and three picture elements ahead of the picture element A and points $a$, $b$, $c$, and $d$ are the corresponding picture elements in the previous line. Thus by comparing corresponding points it is possible to anticipate the end of a feature before it reaches point A. Four logic elements 58, 60, 62, 64 are arranged to do this and each will give an output which is applied to an Or gate 66 when all the picture points A to D, $i$ to $d$ connected thereto are free from signal. Thus an output at any of the logic elements 58 to 64 serves to reset the binary device 46 and this can occur at any time up to three picture elements earlier than it otherwise would have done.

In the system illustrated in FIG. 2 the associated parameter is recirculated in the same delay line. It is generated as before by logic blocks A, B and C as described in FIG. 1 and is added to the modified video in the stage 58. As it emerges from the delay device 50 which is common to both the modified video and the associated parameter, it is gated by one of gates 68, 70, 72, 74 controlled from the appropriate logic element 58, 60, 62 or 64, into logic element B. The new value of the associated parameter is then immediately ready for transmission so that the associated parameter is always to be found at the end of the modified video signal V'.

An anticoincidence circuit is not shown in FIG. 2 but this can be the same as that shown in FIG. 1. Timing and reset and command pulses have also been omitted from the circuit of FIG. 2 and from the description for clarity.

The operational features of the circuit shown in FIG. 2 are the use of delays of time lengths deliberately different from the scan time, the recirculation of a modified video signal whose length is varied "in this case shrunk" in sympathy with the local shape of the feature, the provision of a choice of amounts of shrink and the fact that the timing position of the associated parameter is also adjusted or "slipped" in sympathy with the adjustment of the modified video signal.

Figure 2A:
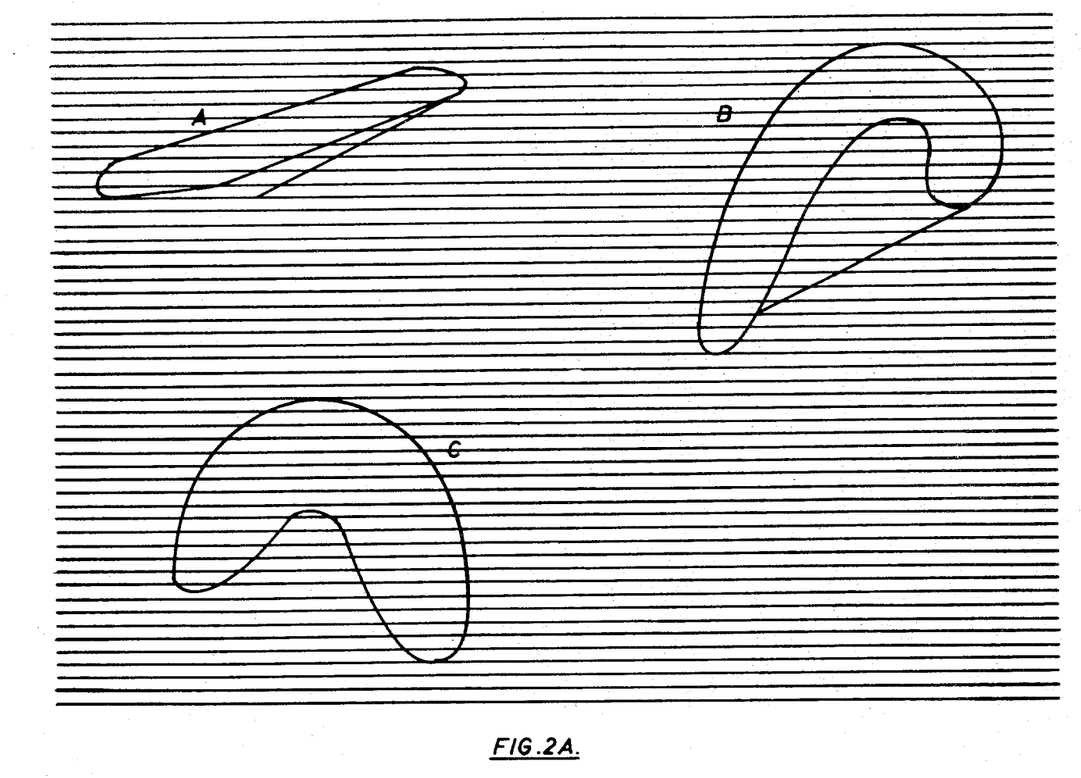
FIG. 2A illustrates graphically the shadow areas below typical features and the counting signal pulses derived from scanning features.

FIG. 2A illustrates the reduced shadow areas under typical features when a system as shown in FIG. 2 is employed.

Figure 3:
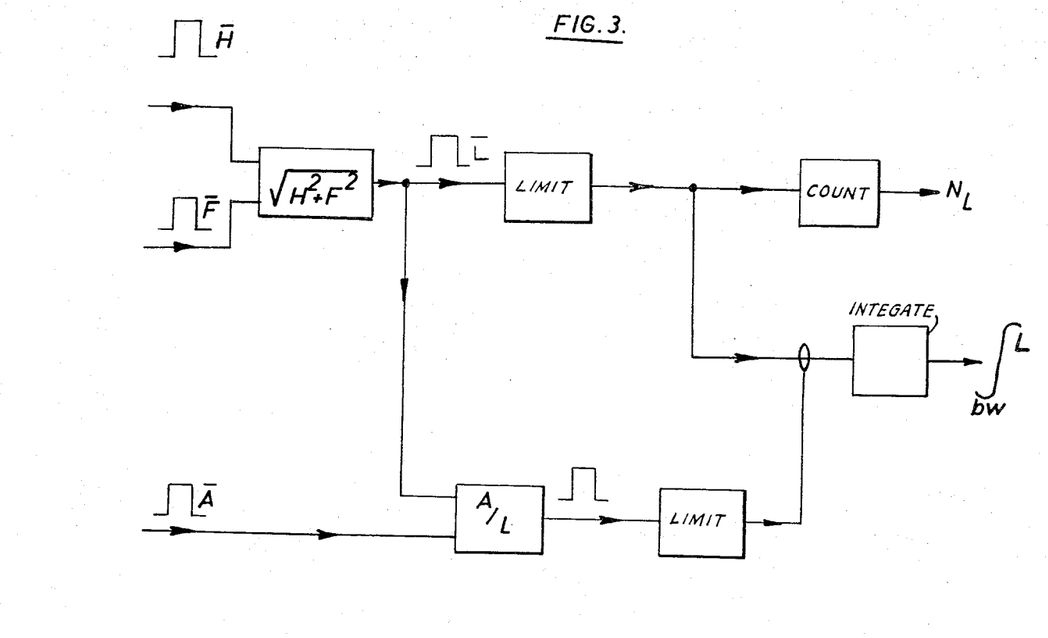
FIG. 3 illustrates a system for handling more than one coincident associated parameter.
Figure 3A:
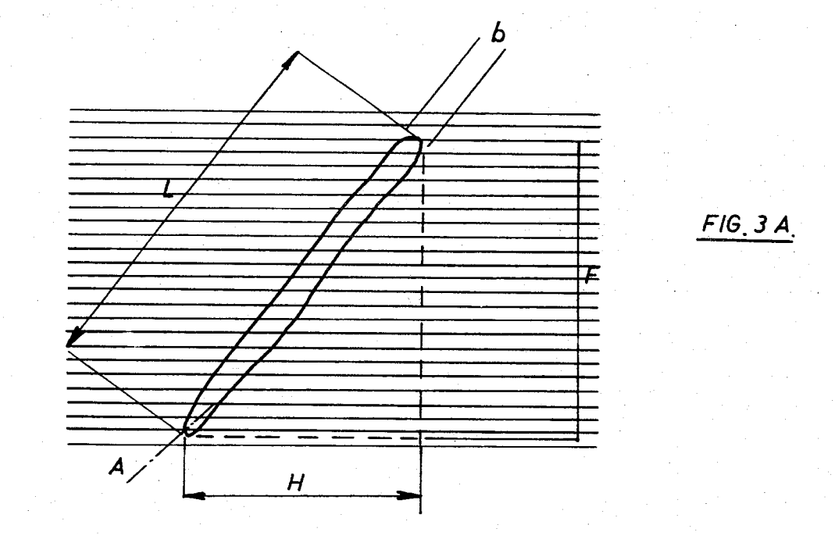
FIG. 3A illustrates graphically a long thin needlelike feature lying at an angle to the scan direction having two dimensions which are of interest H and F each of which gives rise to a separate, associated parameter.

FIG. 3 shows a system for handling three coincident associated parameters H, F and A. In the system illustrated, the pulses are of height proportional to the various parameters. Since all three occur simultaneously elaborate secondary computations and cross couplings are possible. The parameters H, F and A are derived from a long thin feature lying at an angle to the scan of the raster and shown in FIG. 3A. The first condition is a root mean square calculation on H and F to derive the true length of the feature independent of its orientation. This calculated value is then passed through a limiting circuit which selects only those features whose lengths lie between chosen limits. The number of features $N_1$ lying between these limits is then easily counted. At the same time the ratio of area to length A/L is taken by another computing circuit so as to give the average feature width. This is also passed through a limiting circuit and is allowed to gate the signal from the length limiting circuits. Integration of the result then gives the total length contributed by features between both the length and breadth limits imposed.

Figure 4:
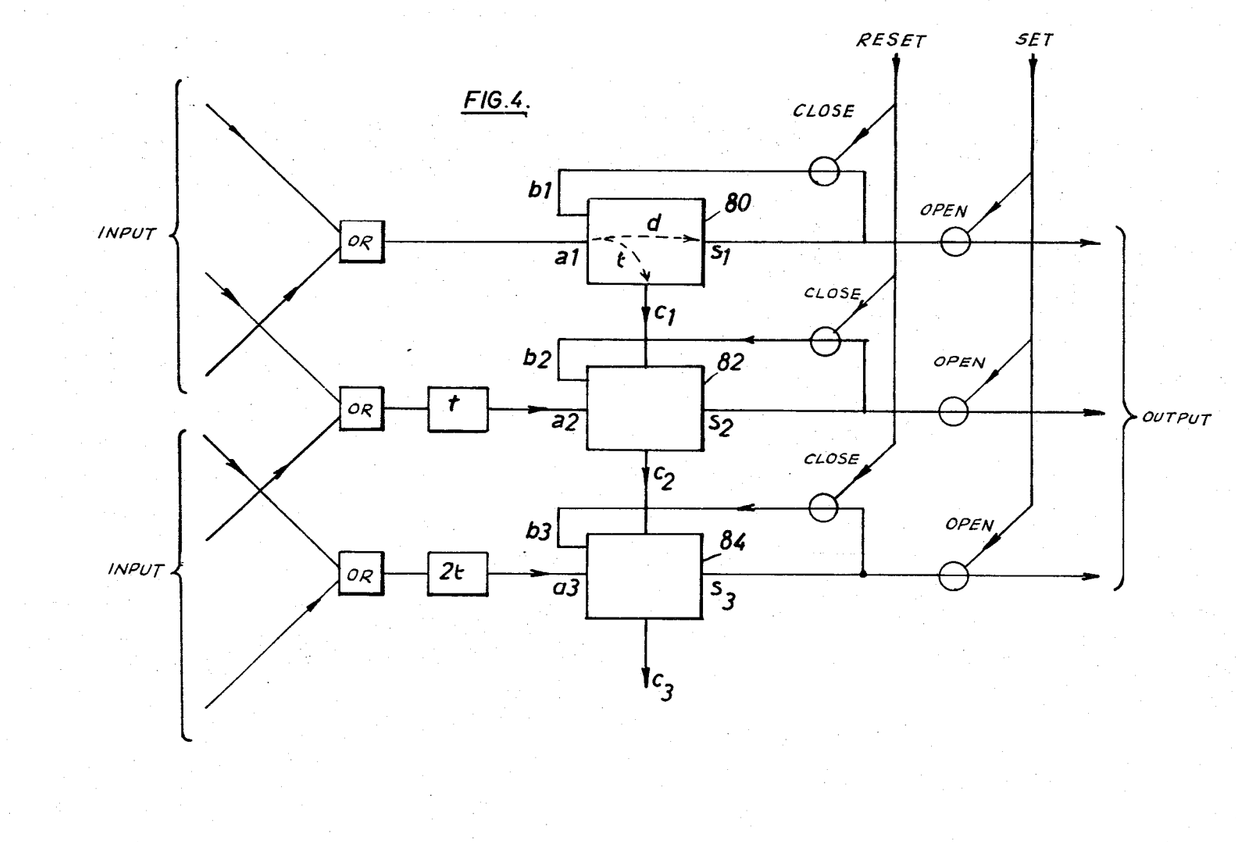
FIG. 4 illustrates a system which can serve as a word accumulator in which data enters the circuit in digital form and is held with some arbitrary time period before a second "word" arrives to be added to the first with another arbitrary time delay before the output is required.

The three logic elements A, B and C of FIGS. 1 and 2 generalized above may have to perform their operations very quickly. The type of system required will often by a "word calculator" in which data enters the circuit in digital form is held for some arbitrary time period before its second word derives to be added to the first with another arbitrary delay before the output is required. FIG. 4 shows a fast and economical system by which this can be achieved.

Standard counting logic stages 80, 82 and 84 are used—each one having two inputs $a$ and $b$ and two outputs $s$ and $c$ representing the "sum" and "carry" bits respectively. In the system illustrated the sum outputs of each counting stage 80 to 84 is connected directly to one of its own inputs $b$. The incoming information is applied to the other counter inputs and is arranged so that the input information is of fixed pulse length $d$ exactly matching the response time of the counting logic stages as reckoned from input to sum output $s$. In the quiescent state, the counting logic stages have some preexisting state. Thus when "$a$" input is zero the "$s$" output equals the "$b$" input. At the arrival of a nonzero input the counter produces a new sum "$s$" at a later time $d$. By the choice of the time delay "$d$". this signal is immediately presented to the "$b$" input just as the "$a$" input dies away to zero again and the original condition of stability applies with the new sum signal.

Similar treatment is employed for the "carry" bits where the logic counting device takes $a$ time $t$ to produce a carry output after the arrival of a fresh input. In order to match this time delay the next higher order count logic device has its input delayed by a similar time $t$. In general therefore each count logic device receives a new input and a new carry input signal simultaneously each of duration $b$ corresponding to the delay to the $s$ output. Both "carry" and "word" inputs fall away as the sum is presented at the "$b$" input to hold the logic device in the new state.

A carry output will be delivered during this sequence. In some cases due to the asymmetry of the internal construction of the logic element the carry output will not have the same pulse-length "$d$" as the input "word". For short "word" lengths (i.e. few bits) this discrepancy will not be important, but when it is important, the length of the carry pulses between the count logic stages can be adjusted by some suitable circuit to match exactly the input "word" pulse-length.

Size distribution can be determined by subjecting all chords to a size criterion before they reach the count circuit and applying only those parts of chords longer than the critical length to the counting circuit. In many cases (particularly when examining parallel-sided features lying at a shallow angle to the scan) the counting circuit will see a plurality of short and unconnected chords which will each count separately as the size criterion approaches the chord length. The system shown in FIG. 5 overcomes this problem.

Figure 5:
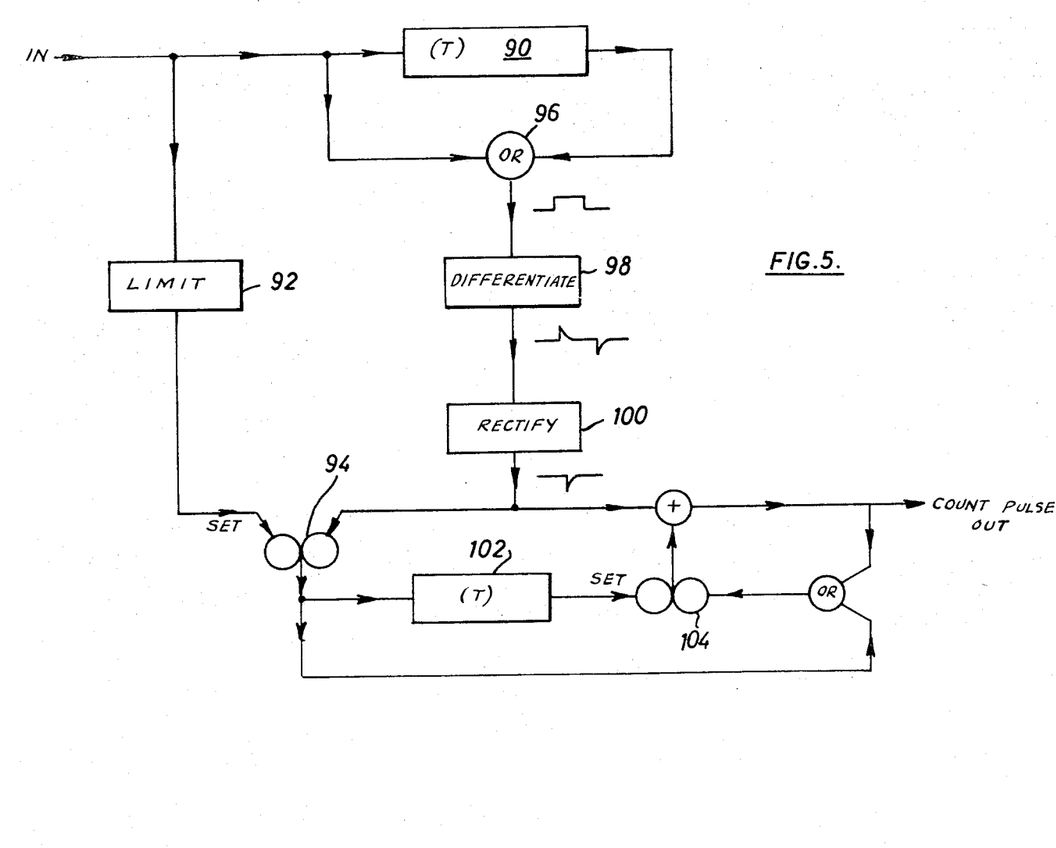
FIG. 5 illustrates a system by which video signals are subjected to a size criterion before application to a counting circuit to pass only those signals greater than a critical size in the line scan direction.

Incoming video is passed directly to a delay line 90 which has a delay equal to the line scan period T. Video is also presented to a "size limit" circuit 92 which only passes that part of the current chord longer than a predetermined size. Chords satisfying this criterion "set" a bistable 44 to generate a tag pulse.

An "Or-gate" 96 is supplied with current and previous video and its output feeds a differentiation circuit 98 and rectification circuit 100 which are arranged to detect the moment when both current and previous chords are finished, to reset bistable 44 and end the "tag pulse." The tag pulse is therefore generated for all current chords satisfying the predetermined size limit. The tag pulse is passed into a second delay line 102 also having a delay equal to one line scan T.

On the next line scan the tag pulse will emerge from the second delay line to set a bistable 104 which will remain "set" unless it is "reset" by the generation of a new tag pulse on the current chord. If bistable 104 is reset in this way then no output is produced and there is no output from the circuit when both current and previous chord finish. If on the other hand bistable 104 is set by a tag pulse from the previous chord and there is no tag pulse on the current chord to reset it, then the circuit will produce an output pulse for counting, when both current and previous chord end. The count pulse also resets bistable 104—thus returning the circuit to its quiescent state.

It should be noted that the only condition required for the release of a count pulse is that the previous chord should have met the size requirement and that the current chord should not. There is thus no diminution of the chord length circulated in the first delay line for coincidence purposes and therefore no tendency for the feature to break up into multiple counts near the critical size other than that caused by the shape of the feature itself. It is also to be noted that the circuit generates a new tag pulse for each chord which satisfies the size requirement and does not recirculate a single tag pulse through the second delay line after its first pass.

Although described for size criteria based on the chord length, the tag pulse could be derived from other parameters for different size criteria.

Figure 6:
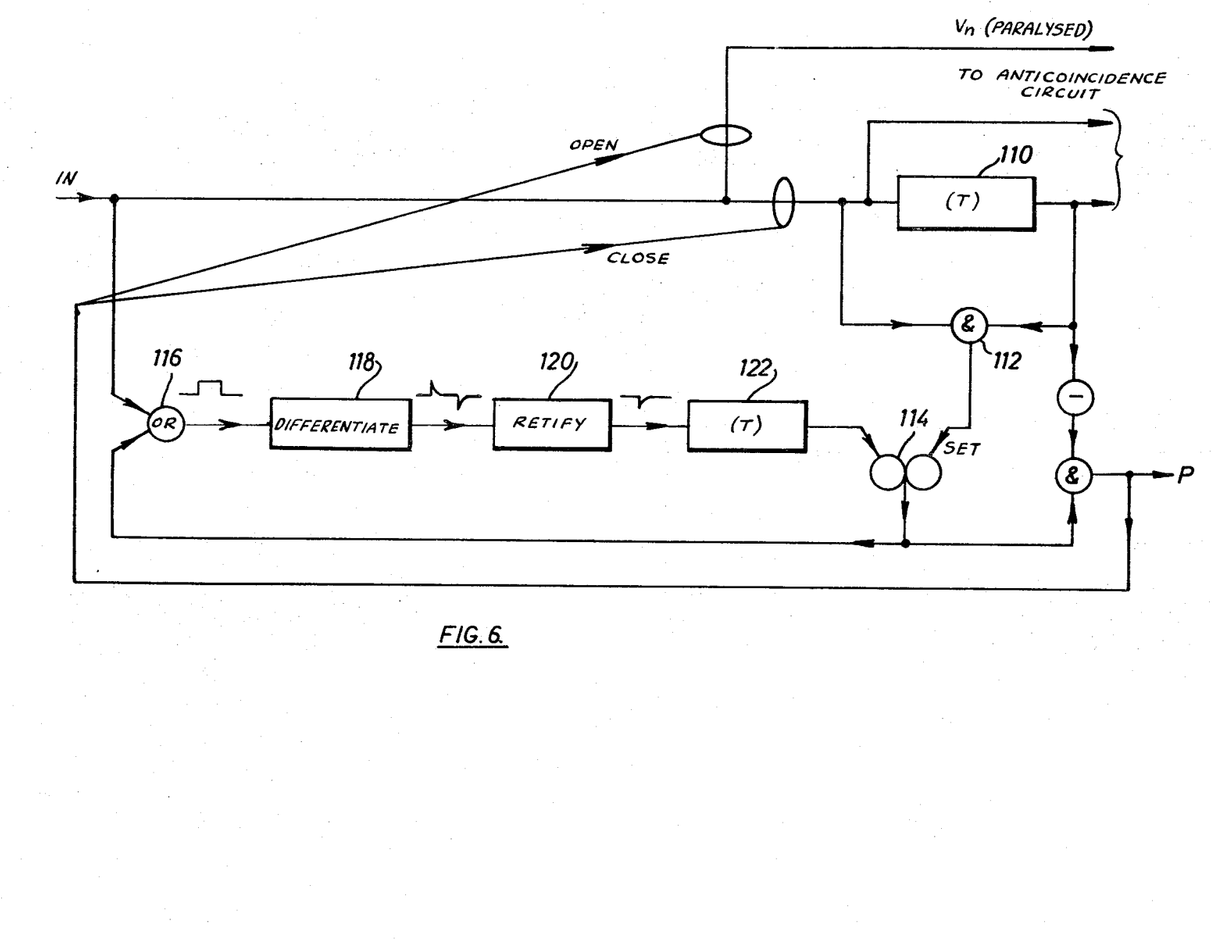
FIG. 6 illustrates a system by which shadow areas can be detected and the area of paralysis removed so that features lying within the area of the paralysis can be examined.

It is not necessary to circulate all the coincidence information as a single bit of information and it can be advantageous to recirculate more than one coincidence parameter. In particular it is useful to circulate two "bits" of information so that the circuit can tell when it is "paralized" and temporarily insensitive to any fresh video information. Such a system is illustrated in FIG. 6.

Here video is passed into a delay line 110 so as to store video from each "previous" chord. Current and previous video are employed to operate a coincidence gate 112 which sets a bistable 114 when there has been coincidence to start a "modification " video signal. An "OR-gate" 116, differentiation circuit 118 and rectification circuit 120 detect when both modification video and true video have ended and feed an "end pulse" into a second delay line 122. The delayed "end pulses" from each previous line serve to reset the modification video generating bistable 114. Comparison with FIG. 1 will show that what was modified video in that case has now been split into two components in separate delay lines namely video and modification video. In this case only the "end pulse" of the modification video is circulated but a similar system could be devised in which the whole modification video signal is recirculated. Given these separate video and modification video signals it is a simple matter to arrange logic elements 113, 115 broadly as illustrated to derive a "paralysis" signal P which indicates when the circuit is insensitive to separate features. This signal can then be used to gate the incoming video by gate 117 as shown in FIG. 6 so that new features occurring in the "paralysis" region are completely ignored by the circuit and gated out quite separately. Such features may be diverted to a separate circuit (not shown) by a gate 119.

The system may be adapted as illustrated in FIG. 2 to reduce the "paralysis" region to a minimum.

Figure 7:
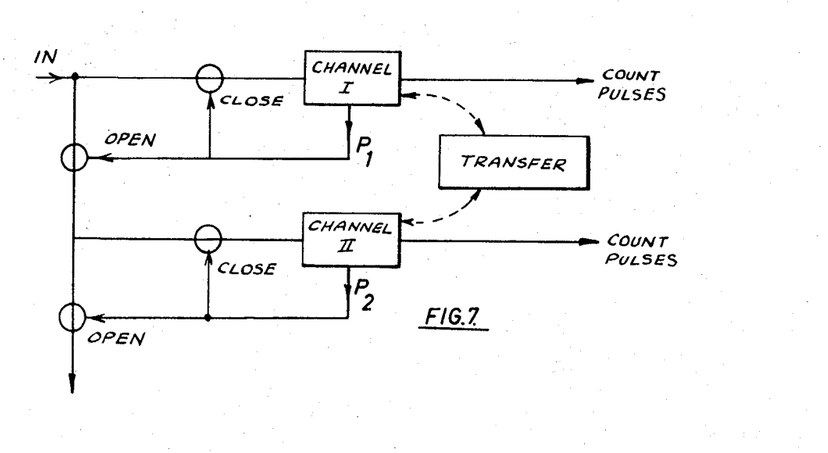
FIG. 7 illustrates a so-called stacking system in which the video signal is gated from one computing system to a duplicated computing system as soon as a paralysis region is detected.

It is possible to partially overcome the problems of feature counting in "paralysed" regions by duplicating the computing circuitry and using "paralysis" signals to gate the video from the one to the other as "paralysis" occurs. A system of this type is illustrated in FIG. 7.

Figure 7A:
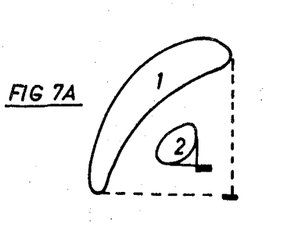
FIG. 7A illustrates graphically the case when the second feature lies wholly within the paralysis region.
Figure 7B:
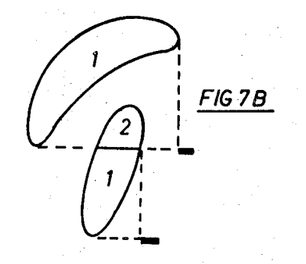
FIG. 7B illustrates graphically the case when the second feature lies only partially within the paralysis region of the first feature.

Normally video is processed by the first channel which might be similar to the arrangement described with reference to FIG. 6. When this channel is "paralysed" then its "paralysis" signal stops the video to channel 1 and passes it to channel 2. Each channel will produce count pulses referring to its own features.

Where the second feature 2 is wholly within the paralysis region of the first feature 1 (as shown in FIG. 7A) then no special arrangements are required to transfer also the associative parameter. However when elaborate count channels are used with associated parameters then it is necessary to arrange for the transfer of these associated parameters by gating means 130 from the one channel to the other so as to be able to cope with the situation illustrated in FIG. 7B, in which a second feature 2 is only partially within the paralysis region of the first feature 1.

Most of the arrangements described above rely for their operation on the recirculation of information around a delay line. It is important that the information is not degraded in amplitude, phase or timing during recirculation, and two systems are proposed for ensuring this and these are shown in FIGS. 8 and 9.

Figure 8:
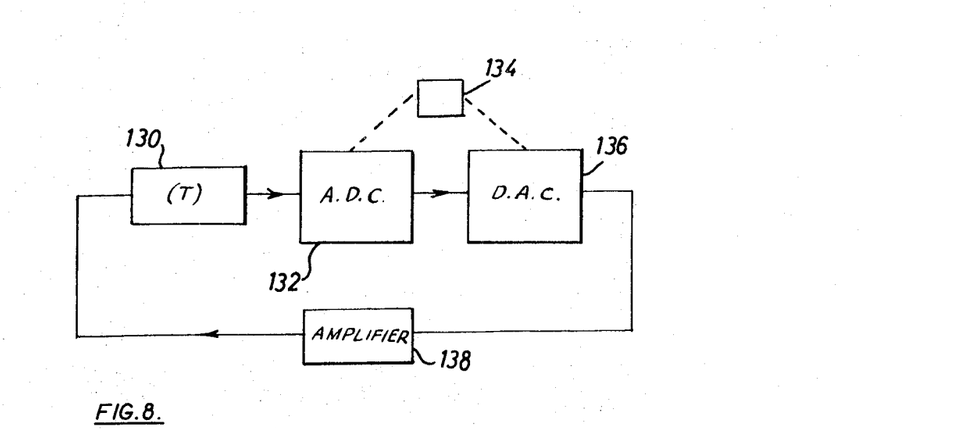
FIG. 8 illustrates one signal storage device in which information can be recirculated without degradation.

In FIG. 8 the output from a delay line 130 is converted to digital form by a conventional analogue-to-digital converter 132 synchronized to a master clock 134. It is then reconverted to analogue form by a converter 136 for subsequent transmission to the delay line. An amplifier 138 may be employed in the loop to make up any attenuation in the delay line and converters. In this way the signal is reconstituted at each pass through the line and if the variation due to changes in parameters of the system loop is less than one unit of the digitizing network or one unit of the clock, the error will be eliminated at each pass.

Figure 9:
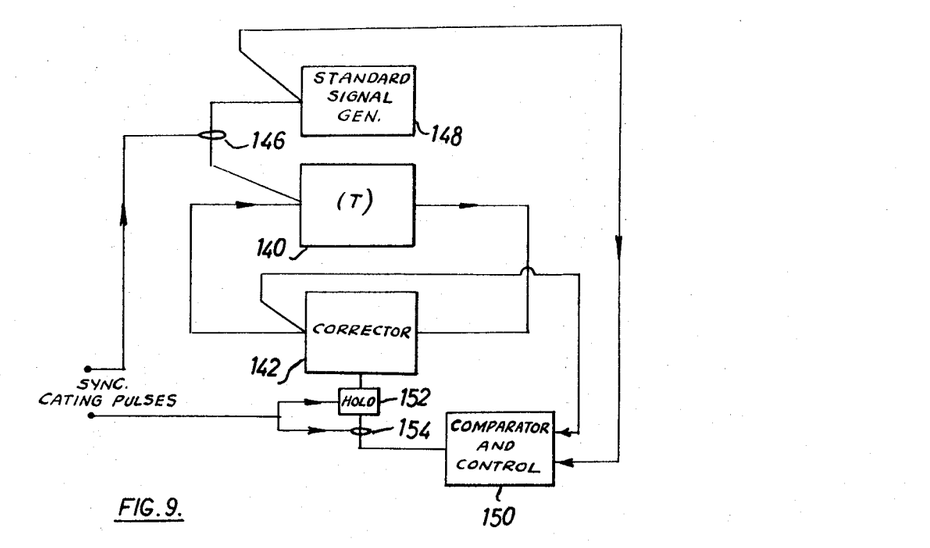
FIG. 9 illustrates an alternative signal storage device in which information can be recirculated without degradation.

In FIG. 9 a standard signal from a generator 148 is transmitted into a delay line 140 at some convenient regularly occurring "dead" period indicated by synchronized gating pulses applied to a gate 146. Conveniently this will be during the "line flyback" period encountered in most scanning systems. The output from the delay line 140 is applied to a corrector circuit 142 and the gain, phase and timing delays of the circuitry subsequent to the delay line are controlled automatically during this signal so as to give unity gain and synchronization around the whole circuit for example, by comparing standard signals after passing through the delay 140 and corrector 142 with standard signals from the generator 148. During the remainder of the line period the corrector parameters are clamped by a hold device 152 to be readjusted during the next control interval if required. To this end gating pulses are applied also to the comparator 150 and a gate 154. This system is a unique combination of the well-known techniques of automatic gain control, as used in radio receivers, and flywheel synchronization, as used in television receivers and might be termed automatic flywheel parameter control.

It will be appreciated that whereas the main circuit elements have been illustrated in the various arrangements shown in the drawings, some circuit elements have been omitted for clarity. To this end, short delay devices which are normally inserted to prevent so-called "races," have not been shown.

In the foregoing specification and the following claims the words "delay device" or "signal storage means" and the like have been used to denote any fixed retrieval period memory system such as magnetic tape, magnetic drum, scanned surfaces, and looped delay lines and shift registers.

Although in general signals representing so-called idealized video signals have been described as being applied to the delay devices, it will be appreciated that, in general these signals could be replaced by signal pulses denoting only the beginning and ending of information signals such as video signals.

I claim:

1. In apparatus employing line scanning for counting features in time coincidence with information relating to a parameter of the features comprising delay means for delaying video signal from each line scan, signal comparison means for comparing the delayed video signal with video signal from the next line scan and means responsive to the comparison controlling the generation of a count pulse pulse for each feature, the improvement comprising circuit means for generating a single anticoincidence pulse for each feature after the last line scan intersection of the feature, computer means for generating an information signal representative of a feature parameter during scanning of the feature, memory means for retaining the information signal from line to line and addressing means operable on the release of the anticoincidence pulse for a feature, to address the memory means and release the information signal stored therein relating to that feature.

2. Apparatus as set forth in claim 1 wherein said circuit means includes additional circuit means for withholding a signal corresponding to the trailing edge of a line scan intersect pulse by an amount just sufficient to bring the trailing edge into coincidence with the trailing edge of a line scan intersect pulse from the same feature delayed from the previous line scan, thereby to associate line scan intersect pulses arising from the scanning of divergent limbs of a reentrant feature.

3. Apparatus as set forth in claim 1 further comprising a bistable pulse forming device in the signal path to the video signal delay means, the bistable device being adapted to be switched into one output state by the leading edge of one intersect pulse and into its other output state by the trailing edge of the one intersect pulse or the trailing edge of an intersect pulse delayed from the previous line scan which is coincident with the one intersect pulse over at least some of its length, whichever occurs later in time.

4. Apparatus as set forth in claim 1 wherein the video signal delay means has a time delay which is less than one line scan period by a known time interval.

5. Apparatus as set forth in claim 4 comprising, in combination, additional signal delay means for delaying video signal for the said known time interval and signal comparison means for comparing line scan intersect information in one line scan with that in the previous line scan separated by different intervals of time equal to and less than one line scan period from that in the said one line scan, means adapted to generate an indicator signal when a signal corresponding to the trailing edge of an intersect pulse in said one line scan occurs before a signal corresponding to the trailing edge of a coincident intersect pulse from the previous line scan by at least a known time increment and gating means for releasing the trailing edge signal of the intersect pulse on the said one line scan, in advance of the delayed trailing edge signal from the previous line by said known time increment, in response to such indication.

6. Apparatus as set forth in claim 5 wherein the memory means includes a plurality of separate signal delay means in series whereby the information signal retained thereby from line to line is also available for release in advance of a complete line scan period by the time increments represented by said separate delay means.

7. Apparatus as set forth in claim 6 wherein the same signal storage means is employed for the video signal line scan intersect information and the information relating to a feature parameter.

8. Apparatus as set forth in claim 1 further comprising circuit means for generating a paralysis pulse when the trailing edge signal of a line scan intersect pulse on one line scan occurs before the trailing edge signal of a line scan intersect pulse delayed from the previous line scan, at least some of which is coincident with the intersect pulse on the one line scan, the magnitude of the paralysis pulse indicating the difference in time between the two trailing edge signals and therefore the time following the trailing edge signal of the line scan intersect pulse on the one line scan during which the apparatus is insensitive to features or feature portions lying beyond the feature in the direction of line scan to which the intersect pulse relates.

9. Apparatus as set forth in claim 8 comprising switch means operable by said paralysis pulse to prevent line scan intersect information arising during a paralysis pulse from being received by the apparatus.

10. Apparatus as set forth in claim 9 comprising further switch means operable by said paralysis pulse to divert line scan intersect information arising during a paralysis pulse to another feature counting apparatus.

11. Apparatus as set forth in claim 10 comprising additional switch means also operable in response to the paralysis pulse for transferring information signals relating to a feature parameter and arising during a paralysis pulse to another computer means.

12. In apparatus employing line scanning for counting features in time coincidence with information relating to a parameter of the features comprising delay means for delaying video signal from each line scan, signal comparison means for comparing the delayed video signal with video signal from the next line scan and means responsive to the comparison controlling the generation of a count pulse for each feature, the improvement comprising computer means for deriving an information signal relating to a parameter of a feature during a line scan intersection therewith, signal delay means for storing the information signal from one line scan to the next, circuit means applying the output of the delay means to the input thereof for recirculating the information signal and gating means operable on release of the count pulse for the feature, to release the information signal therewith.

13. Apparatus as set forth in claim 12 wherein an information signal is derived by the computer means during each of the line scan intersections with a feature.

14. Apparatus as set forth in claim 13 further comprising second computer means adapted to update the total information computed for a feature from all previous information signals therefrom, by the information signal arising during each successive line scan intersection therewith before recirculating the information, said second computer means forming part of said circuit means.

15. Apparatus as set forth in claim 4 wherein the information signal is the analogue video signal pulse representing the feature intersection.

16. Apparatus as set forth in claim 12 wherein the second computer means receives an information signal for each line scan intersection and simultaneously therewith an information signal from the preceding line scan intersection.

17. Apparatus as set forth in claim 12 wherein the magnitude of each information signal derived by the first mentioned computer means corresponds to the duration of the intersect pulse and thereby gives a measure of the length of that line scan intersect of the feature.

18. Apparatus as set forth in claim 17 comprising second computer means adapted to add the information signal from each line scan intersection with a feature to any previous information signals arising from the feature thereby to generate an electrical signal whose total magnitude corresponds to the area of the feature.

19. Apparatus as set forth in claim 12 wherein the computer means is adapted to derive a unit information signal from each line scan intersection with a feature.

20. Apparatus as set forth in claim 19 further comprising second computer means adapted to add the unit information signal from each line scan intersection with a feature to any previous unit information signals arising from the feature, thereby to generate an electrical signal whose magnitude is indicative of the length dimension of the feature perpendicular to the direction of line scan.

21. Apparatus as set forth in claim 12 wherein said signal delay means is a delay line thereby to enable analogue signals to be stored.

22. Apparatus as set forth in claim 12 wherein said signal delay means is a shift register thereby to enable digital signals to be stored.

23. Apparatus as set forth in claim 12 comprising circuit means for generating a paralysis pulse when the trailing edge signal of a line scan intersect pulse on one line scan occurs before the trailing edge signal of a line scan intersect pulse delayed from the previous line scan, at least some of which is coincident with the intersect pulse on the one line scan, the magnitude of the paralysis pulse indicating the difference in time between the two trailing edge signals and therefore the time following the trailing edge signal of the line scan intersect pulse on the one line scan during which the apparatus is insensitive to features or feature portions lying beyond the feature in the direction of line scan to which the intersect pulse relates.

24. Apparatus as set forth in claim 23 further comprising switch means operable by said paralysis pulse to prevent line scan intersect information arising during a paralysis pulse from being received by the apparatus.

25. Apparatus as set forth in claim 24 further comprising further switch means operable by said paralysis pulse to divert line scan intersect information arising during a paralysis pulse to another feature counting apparatus.

26. Apparatus as set forth in claim 25 further comprising additional switch means also operable in response to the paralysis pulse for transferring information signals relating to a feature parameter and arising during a paralysis pulse to another computer means.

27. In apparatus employing line scanning for counting individual features in which video signal from each line scan is delayed and compared with video signal from the next line scan for controlling the generation of a count pulse for each feature the improvement comprising circuit means for withholding a signal corresponding to the trailing edge of a line scan intersect pulse by an amount just sufficient to bring its trailing edge into coincidence with the trailing edge of a line scan intersect pulse from the same feature, delayed from the previous line scan, thereby to associate line scan intersect pulses arising from the scanning of divergent limbs of a reentrant feature.

28. Apparatus as set forth in claim 27 wherein said circuit means includes a bistable pulse forming device in the signal path to the video signal delay means, the bistable device being adapted to be switched into one output state by the leading edge of one intersect pulse and into its other output state by the trailing edge of the one intersect pulse or the trailing edge of an intersect pulse delayed from the previous line scan which is coincident with the one intersect pulse over at least some of its length, whichever occurs later in time.

29. Apparatus as set forth in claim 27 wherein the video signal delay means has a time delay which is less than one line scan period by a known time interval.

30. In apparatus employing line scanning for counting features comprising delay means for delaying video signal from each line scan signal comparison means for comparing the delayed video signal with video signal from the next line scan, means responsive to the comparison controlling the generation of a count pulse for each feature and means generating a trigger pulse for any line scan intersect pulse which fulfills a predetermined size criterion the improvement comprising first circuit means responsive to video from a current line scan and from the previous line scan to generate an output signal when both a current and delayed coincident intersect pulse have ended, second circuit means responsive to a trigger pulse and an output signal to generate a tag pulse for the line scan intersect pulse further delay means to delay a generated tag pulse for the duration of one line scan and logic circuit means responsive to tag pulses from current and previous line scans to release an output signal as a single count signal for a feature when an output signal is received after a tag pulse from a previous line but before a tag pulse from the current line.

31. In apparatus employing line scanning for counting features in time coincidence with information relating to the features in which video signal from each line scan is delayed and compared with video signal from the next line scan to control the generation of a count pulse for each feature the improvement comprising circuit means for generating a single anticoincidence pulse for each feature after the last line scan intersection of the feature, computer means for generating information signals representative of different parameters of a feature during scanning of the feature, memory means for retaining the information signals from line to line and addressing means operable on release of the anticoincidence pulse for a feature, to address the memory means and release the information signals stored therein relating to that feature.

32. Apparatus as set forth in claim 31 comprising further computer means responsive to some or all of the information signals released for a feature and adapted to compute further parameters for the feature therefrom.

33. Apparatus as set forth in claim 68 wherein the further computer means is adapted to control the final release of a count pulse for a feature in dependence on the value of one or other of the parameters computed for the feature.

34. For apparatus as set forth in claim 31, signal storage means for an analogue signal comprising a delay line, analogue to digital signal convertor means supplied with delayed signals from the delay line, common master clock means for supplying synchronizing pulses to the convertor means, digital to analogue signal convertor means also synchronized by the common master clock means, supplied with the digital output signal from the first mentioned convertor means to form a new signal corresponding to the original analogue signal and means to apply the new signal to the input of the delay line for recirculation.

35. For apparatus as set forth in claim 31 signal storage means for an analogue signal comprising a delay line and signal amplifier means for amplifying the output from the delay line and applying it to the input to the line for recirculating signals around the loop formed by the delay line and the amplifier, circuit means for generating a standard signal during periods when no video signal is applied to the delay line signal comparison means for comparing the parameters of each standard signal after passing through the delay line with the correct signal parameters and means responsive to the comparison to adjust the transfer function of the amplifier means to reduce any variation in parameter of the delayed standard signal.

* * * * *